United States Patent
Baumheinrich et al.

(10) Patent No.: US 10,820,390 B2
(45) Date of Patent: Oct. 27, 2020

(54) METHOD OF OPERATING AN OPTOELECTRONIC COMPONENT AND OPTOELECTRONIC COMPONENT

(71) Applicant: OSRAM OLED GmbH, Regensburg (DE)

(72) Inventors: Thorsten Baumheinrich, Altdorf (DE); Stefan Grötsch, Bad Abbach (DE)

(73) Assignee: OSRAM OLED GmbH, Regensburg (DE)

( * ) Notice: Subject to any disclaimer, the term of this patent is extended or adjusted under 35 U.S.C. 154(b) by 0 days.

(21) Appl. No.: 16/484,612

(22) PCT Filed: Mar. 9, 2018

(86) PCT No.: PCT/EP2018/055930
§ 371 (c)(1),
(2) Date: Aug. 8, 2019

(87) PCT Pub. No.: WO2018/162721
PCT Pub. Date: Sep. 13, 2018

(65) Prior Publication Data
US 2020/0060004 A1    Feb. 20, 2020

(30) Foreign Application Priority Data
Mar. 10, 2017   (DE) .................. 10 2017 105 131

(51) Int. Cl.
*H05B 45/50*     (2020.01)
*G02B 6/42*      (2006.01)

(52) U.S. Cl.
CPC ........... *H05B 45/50* (2020.01); *G02B 6/4274* (2013.01)

(58) Field of Classification Search
None
See application file for complete search history.

(56) References Cited

U.S. PATENT DOCUMENTS

| | | | |
|---|---|---|---|
| 8,081,271 B2 | 12/2011 | Kobayashi et al. | |
| 2005/0230600 A1 | 10/2005 | Olson et al. | |
| 2007/0040512 A1 | 2/2007 | Jungwirth et al. | |
| 2007/0040518 A1 | 2/2007 | Young | |
| 2009/0273930 A1* | 11/2009 | Kraus | F21K 9/00 362/257 |
| 2010/0103663 A1 | 4/2010 | Kubis et al. | |
| 2011/0109655 A1 | 5/2011 | Takeda | |
| 2012/0039614 A1* | 2/2012 | Miura | H04B 10/00 398/135 |

(Continued)

FOREIGN PATENT DOCUMENTS

| | | |
|---|---|---|
| DE | 10 2014 118 440 A1 | 6/2016 |
| EP | 2 141 965 A1 | 1/2010 |

(Continued)

*Primary Examiner* — Crystal L Hammond
(74) *Attorney, Agent, or Firm* — DLA Piper LLP (US)

(57) ABSTRACT

A method of operating an optoelectronic component, including a plurality of picture elements and a plurality of temperature sensors, wherein the picture elements are each configured to emit light, and the temperature sensors thermally conductively connect to the picture elements, the method including acquiring temperature values supplied by the temperature sensors; and controlling the picture elements in dependence on the acquired temperature values.

23 Claims, 3 Drawing Sheets

(56) References Cited

U.S. PATENT DOCUMENTS

2013/0016306 A1* 1/2013 Ohno .................. G09G 3/3426
349/61
2013/0120677 A1 5/2013 Lin et al.
2013/0321361 A1 12/2013 Lynch et al.

FOREIGN PATENT DOCUMENTS

EP  3 013 122 A2  4/2016
WO  2007/022409 A2  2/2007

\* cited by examiner

METHOD OF OPERATING AN OPTOELECTRONIC COMPONENT AND OPTOELECTRONIC COMPONENT

TECHNICAL FIELD

This disclosure relates to a method of operating an optoelectronic component and an optoelectronic component.

BACKGROUND

Optoelectronic components comprising a plurality of picture elements are known. Such optoelectronic components can be used, for example, as modules for constructing video walls, flash devices for photographic recordings, or headlights for motor vehicles. In particular in a dense arrangement of a plurality of picture elements, a risk of local overheating exists in such optoelectronic components.

SUMMARY

We provide a method of operating an optoelectronic component, including a plurality of picture elements and a plurality of temperature sensors, wherein the picture elements are each configured to emit light, and the temperature sensors thermally conductively connect to the picture elements, the method including acquiring temperature values supplied by the temperature sensors; and controlling the picture elements in dependence on the acquired temperature values.

We also provide an optoelectronic component including a plurality of picture elements, each configured to emit light, and a plurality of temperature sensors thermally conductively connected to the picture elements.

We further provide an optoelectronic component including a plurality of picture elements, each configured to emit light, and a plurality of temperature sensors thermally conductively connected to the picture elements, wherein the optoelectronic component includes a carrier, the optoelectronic component includes at least one light-emitting diode chip arranged on an upper side of the carrier, the carrier is formed as a semiconductor chip, and the temperature sensors are integrated into the carrier.

LIST OF REFERENCE SIGNS 10 optoelectronic component
100 picture element
101 light
110 two-dimensional matrix arrangement
111 middle region
112 peripheral region
120 group of adjacent picture elements
121 first picture elements
122 second picture elements
130 light-emitting diode chip
140 current source
200 temperature sensor
210 two-dimensional matrix arrangement
300 control unit
310 storage device
400 carrier
401 upper side

DETAILED DESCRIPTION

Our method of operating an optoelectronic component comprising a plurality of picture elements and a plurality of temperature sensors, wherein the picture elements are each configured to emit light, and the temperature sensors are thermally conductively connected to the picture elements, comprises steps of acquiring temperature values supplied by the temperature sensors and controlling the picture elements in dependence on the acquired temperature values.

This method advantageously enables monitoring the temperatures prevailing in the optoelectronic component. The presence of multiple temperature sensors permits accurate and location-dependent monitoring of the temperatures prevailing in the optoelectronic component. Control of the picture elements in dependence on the acquired temperature values permits excess local heating (formation of hotspots) to be prevented. The picture elements of the optoelectronic component can thus be operated so that the risk of damage or excess aging of the individual picture elements of the optoelectronic component is reduced. Moreover, the option is advantageously available of controlling the picture elements of the optoelectronic component so that temperature-dependent effects are compensated for. In this way, for example, temperature-dependent changes of the emission properties of the picture elements of the optoelectronic component are prevented or minimized.

The method may comprise an additional step of interpolating the acquired temperature values to obtain further temperature values. The method thus also advantageously enables a determination of the prevailing temperature at locations of the optoelectronic component at which temperature sensors are not provided. The method thus enables an accurate location-dependent and temperature-dependent control of the picture elements of the optoelectronic component.

The supply voltage or supply current strength may be changed in dependence on the acquired temperature values in at least one picture element. A temperature-dependent displacement of characteristic curves of the picture elements of the optoelectronic component can thus advantageously be compensated for. This enables the optoelectronic component to be operated in a temperature-independent manner having substantially consistent characteristics.

The supply voltage or the supply current may be changed so that a wavelength, an intensity, a light color, and/or a color temperature of the light emitted by the picture element approximates a target value. The method thus advantageously ensures that the wavelength, intensity, light color, and/or color temperature of light emitted by the picture element does not change or only changes by a minor amount in a change of the temperature of the picture element.

The supply voltage or the supply current may be changed so that a temperature of the picture element decreases. The method thus advantageously enables undesired strong heating of the picture element to be prevented or reversed. Excess aging or another type of damage to the picture element can thus be prevented, for example. Moreover, an undesired change of one or more characteristics of the light emitted by the picture element can thus be prevented or restricted to a minor amount.

The method may comprise a further step of logging the acquired temperature values. Logging the acquired temperature values can be carried out, for example, by storing the acquired temperature values in a digital data memory. Logging the acquired temperature values advantageously enables a recourse to the acquired temperature values at a later point in time. This enables, for example, a time curve of the temperature values to be analyzed, a time trend of the acquired temperature values to be recognized, minimum and/or maximum temperature values to be determined, and the acquired temperature values to be subjected to a statistical analysis. Further controlling the picture elements in dependence on the acquired temperature values is thus advantageously enabled.

The method may comprise a further step of computing thermal stress incurred over the previous operating life for each picture element from the logged temperature values. In the computation of the thermal stress incurred over the previous operating life, it can be taken into consideration, for example, that an operation at high temperature stresses the picture elements of the optoelectronic component more strongly than an operation at lower temperature. Computation of the thermal stress for each picture element of the optoelectronic component can enable, for example, the picture elements of the optoelectronic component to be controlled such that an excess thermal stress of individual picture elements of the optoelectronic component is prevented and/or all picture elements of the optoelectronic component incur an approximately equal thermal stress.

Control of the picture elements may be carried out in dependence on the computed thermal stress of the respective picture elements. Controlling picture elements having already experienced a strong thermal stress such that they only additionally incur a low thermal stress is thus enabled, for example. Alternatively or simultaneously, picture elements, the previous thermal stress of which was low, can be controlled so that they experience a higher thermal stress. This can enable, for example, the service life of the optoelectronic component to be maximized and/or the light emitted by the optoelectronic component to be stabilized as strongly as possible over the entire service life of the optoelectronic component.

The method may comprise a further step of computing a remaining service life to be expected for each picture element from the computed thermal stresses. The method thus advantageously enables, for example, the picture elements of the optoelectronic component to be controlled so that individual picture elements of the optoelectronic component do not comprise a substantially shorter remaining service life to be expected than the remaining picture elements of the optoelectronic component. This can enable the overall service life of the optoelectronic component to be maximized.

Randomly selected first picture elements of a group of adjacent picture elements may be controlled so that they emit light, while the remaining picture elements of the group of adjacent picture elements may be controlled so that they do not emit light. Due to the random selection of the first picture elements that emit light, all picture elements of the group of adjacent picture elements can thus advantageously be stressed approximately equally strongly over a longer period of time and thus age approximately similarly strongly. It is thus advantageously possible to prevent individual picture elements of the optoelectronic component from being subjected to excessively strong aging, which could have an unnecessarily early failure of the optoelectronic component as the result.

Our optoelectronic component comprises a plurality of picture elements, each configured to emit light, and a plurality of temperature sensors thermally conductively connected to the picture elements.

The temperature sensors in a thermally conductive connection to the picture elements of the optoelectronic component advantageously enable acquisition of the temperature of the picture elements of the optoelectronic component. An accurate, location-dependent acquisition of the temperature of the picture elements is enabled by provision of a plurality of temperature sensors.

The optoelectronic component may comprise a control unit configured to operate the optoelectronic component according to a method of the above-mentioned type. The control unit of the optoelectronic component advantageously enables the picture elements of the optoelectronic component to be controlled in dependence on the temperature values acquired using the temperature sensors. Control of the picture elements in dependence on the acquired temperature values permits excess local heating (formation of hotspots) to be prevented. The picture elements of the optoelectronic component can thus be operated so that the risk of damage or excess aging of the individual picture elements of the optoelectronic component is reduced. Moreover, it advantageously offers the option of controlling the picture elements of the optoelectronic component so that temperature-dependent effects are compensated for. In this way, for example, temperature-dependent changes of the emission properties of the picture elements of the optoelectronic component can be prevented or minimized.

The optoelectronic component may comprise a carrier. Moreover, the optoelectronic component may comprise at least one light-emitting diode chip arranged on an upper side of the carrier. The carrier of the optoelectronic component can advantageously also be used for the electrical contacting of the light-emitting diode chip.

The light-emitting diode chip may connect to the upper side of the carrier by a solder connection, a hybrid bond connection, or a direct bond connection. These connection technologies advantageously enable a mechanically stable connection and an electrical contact.

The carrier may be formed as a semiconductor chip. For example, the carrier can be formed as a semiconductor chip made of silicon. The carrier can advantageously comprise integrated circuits and integrated electronic components in this example. The optoelectronic component may thus advantageously be formed very compactly.

The temperature sensors may be integrated into the carrier. The temperature sensors thus advantageously enable a temperature measurement close to the picture elements of the optoelectronic component.

Each light-emitting diode chip may form multiple picture elements. The light-emitting diode chip can comprise multiple integrated light-emitting diode structures for this purpose, which can be arranged, for example, in a line or matrix arrangement Each picture element may comprise at least one light-emitting diode chip. The picture elements of the optoelectronic component thus advantageously each comprise a small size and can be integrated into the optoelectronic component with high density. Each picture element of the optoelectronic component can also comprise multiple light-emitting diode chips. In this example, the picture elements of the optoelectronic component can be configured, for example, to emit light having settable light color.

The number of the temperature sensors may be less than or equal to the number of the picture elements. It is advantageously made possible by a favorable arrangement of the temperature sensors to acquire the temperatures of the individual picture elements with high accuracy even when the number of the temperature sensors is less than the number of the picture elements. In this example, the temperature values acquired by the temperature sensors can be interpolated, for example, to obtain further temperature values.

The picture elements may be arranged in a two-dimensional matrix arrangement. In this example, the picture elements can also be referred to as pixels. Picture elements arranged in a two-dimensional matrix arrangement advantageously enable generation of settable light patterns, images, and/or light distributions.

The temperature sensors may be arranged in a two-dimensional matrix arrangement. The temperature sensors can thus advantageously be distributed particularly uniformly over the picture elements of the optoelectronic component, whereby a precise determination of the temperatures of the individual picture elements is enabled.

A middle region of the matrix arrangement of picture elements may comprise a higher number of temperature sensors per picture element than a peripheral region of the matrix arrangement of picture elements. A particularly accurate determination of the temperatures of the picture elements of the optoelectronic component is thus advantageously enabled in the middle region of the matrix arrangement of picture elements. A particularly accurate temperature-dependent control of the picture elements of the optoelectronic component located in the middle region of the matrix arrangement is thus enabled. A particularly high risk of overheating of individual picture elements in the middle region of the matrix arrangement can thus be reduced.

The optoelectronic component may comprise a plurality of current sources or voltage sources that apply electric current and electric voltage to the picture elements. The individual current sources or voltage sources can advantageously enable the individual picture elements to be controlled independently of one another and in dependence on the acquired temperature values. The optoelectronic component is thus advantageously operable particularly flexibly.

The current sources or voltage sources may be integrated into the carrier. Very compact external dimensions of the optoelectronic component thus advantageously result.

The optoelectronic component may comprise a storage device that saves acquired temperature values. The storage device advantageously enables logging of temperature values acquired by the temperature sensors.

The above-described properties, features, and advantages and the manner in which they are achieved will become more clearly and plainly comprehensible in conjunction with the following description of examples, explained in greater detail in conjunction with the drawings.

Figure 1:
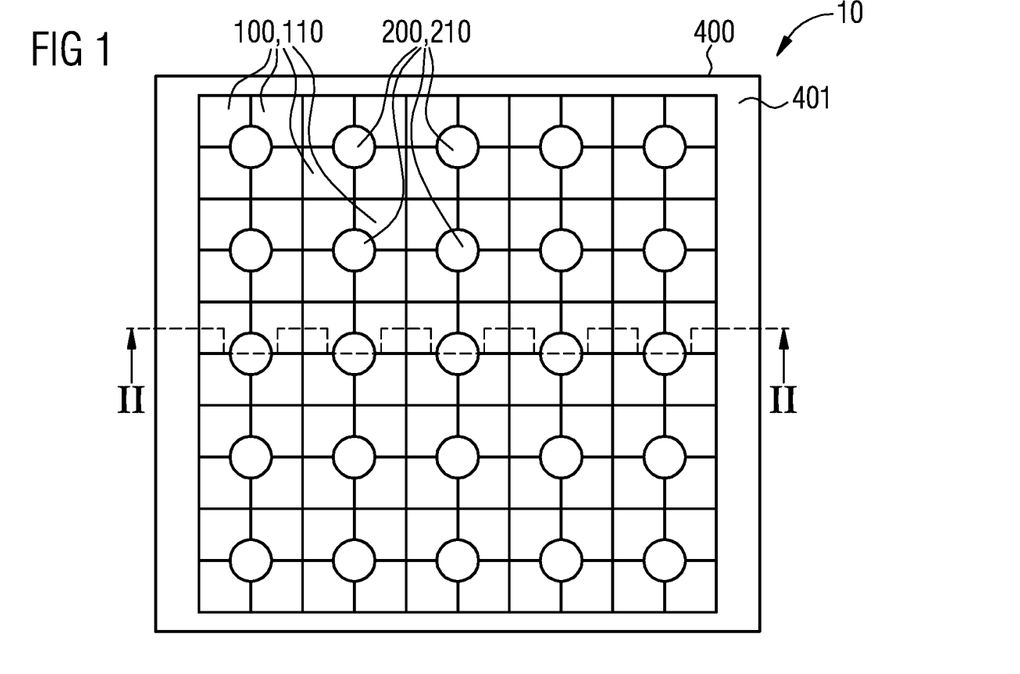
FIG. 1 schematically shows a top view of an optoelectronic component.
Figure 2:
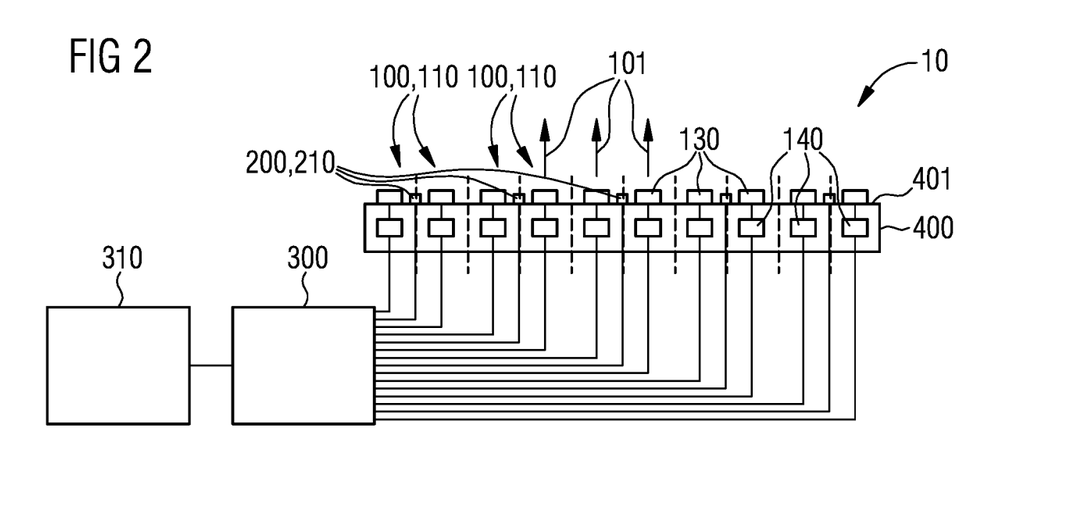
FIG. 2 schematically shows a sectional side view of the optoelectronic component.

FIG. 1 shows a top view of an optoelectronic component 10 in a schematic illustration. FIG. 2 shows a sectional side view of the optoelectronic component 10, also in a schematic illustration. In this example, the optoelectronic component 10 is in section in the illustration of FIG. 2 along a line of section shown in FIG. 1.

The optoelectronic component 10 can be, for example, a module for constructing a video wall. The optoelectronic component 10 can also be part of a flash device provided to illuminate a room region for a photographic recording. The optoelectronic component 10 can also be part of a headlight for a motor vehicle. The optoelectronic component 10 can also be provided for another intended application, however.

The optoelectronic component 10 comprises a plurality of picture elements 100. The picture elements 100 are arranged laterally adjacent to one another so that upper sides of the picture elements 100 are located in a common plane. In the example shown in FIGS. 1 and 2, the picture elements 100 are arranged in a two-dimensional matrix arrangement 110. The picture elements 100 can also be arranged in another regular or irregular arrangement, however. The two-dimensional matrix arrangement 110 comprises ten lines and ten columns in the illustrated example. However, the two-dimensional matrix arrangement 110 can also be formed having a different number of lines and columns. In this example, the two-dimensional matrix arrangement 110 does not have to be square.

In the example shown in FIGS. 1 and 2, the upper sides of the picture elements 100 each comprise a square shape. In this example, the upper sides of all picture elements 100 are of equal size. However, this is not absolutely required. The picture elements 100 can also comprise other non-square or non-rectangular shapes. The shapes and sizes of different picture elements 100 of the optoelectronic component 10 can also differ from one another.

The picture elements 100 of the optoelectronic component 10 are each configured to emit light 101 at the upper sides thereof. The light 101 can be, for example, visible light, light having a wavelength from the infrared or the ultraviolet spectral range, or electromagnetic radiation having a different wavelength.

In the example shown in FIGS. 1 and 2 of the optoelectronic component 10, each picture element 100 comprises a light-emitting diode chip 130 (LED chip). The light-emitting diode chips 130 are not shown in FIG. 1 for the sake of comprehensibility. It is also possible to equip each picture element 100 of the optoelectronic component 10 with more than one light-emitting diode chip 130. For example, each picture element 100 of the optoelectronic component 10 can comprise a light-emitting diode chip 130 emitting in the red spectral range, a light-emitting diode chip 130 emitting in the blue spectral range, and a light-emitting diode chip 130 emitting in the green spectral range. In this example, each picture element 100 of the optoelectronic component 10 can enable an emission of light 101 having settable light color.

Alternatively, however, multiple picture elements 100 can also be formed by a single light-emitting diode chip 130. The light-emitting diode chip 130 comprises multiple light-emitting portions in this example, arranged in a one-dimensional or two-dimensional arrangement, i.e., for example, in a strip arrangement or a matrix arrangement.

In the example shown in FIGS. 1 and 2, the optoelectronic component 10 comprises a carrier 400 having an upper side 401. The light-emitting diode chips 130 of the picture elements 100 are arranged on the upper side 401 of the carrier 400 and electrically contacted via the carrier 400. The light-emitting diode chips 130 can be fastened and electrically contacted, for example, via solder connections, hybrid bond connections, or direct bond connections on the upper side 401 of the carrier 400.

The carrier 400 can be formed, for example, as a circuit board, a ceramic carrier, or a semiconductor substrate. The carrier 400 can be, for example, a semiconductor chip having integrated electronic circuits. Another structure of the optoelectronic component 10 is also possible.

In the example of the optoelectronic component 10 shown in FIGS. 1 and 2, each picture element 100 comprises a current source 140 provided to supply the light-emitting diode chip 130 of the respective picture element 100 with electric current and electric voltage. The current sources 140 are shown as embedded (integrated) into the carrier 400 in FIG. 2. However, this is solely by way of example. The current sources 140 can alternatively also be arranged on the upper side 401 of the carrier 400, on a lower side of the carrier 400, or separately from the carrier 400. An integration of the current sources 140 into the carrier 400 can be reasonable, for example, if the carrier 400 is formed as a semiconductor chip.

The current sources 140 enable the light-emitting diode chips 130 of the individual picture elements 100 to be controlled independently of one another. For this purpose, the current sources 140 are configurable and/or controllable. If each picture element 100 comprises more than one light-emitting diode chip 130, a corresponding plurality of current sources 140 can thus be associated with each picture element 100 so that each light-emitting diode chip 130 of each picture element 100 can be controlled independently of one another. In simplified examples, however, it is also possible to provide fewer current sources 140 than light-emitting diode chips 130 and/or fewer current sources 140 than picture elements 100. For example, the light-emitting diode chips 130 of adjacent picture elements 100 can be coupled to one another and supplied by a common current source 140.

Instead of the current sources 140, voltage sources can also be provided.

The optoelectronic component 10 furthermore comprises a plurality of temperature sensors 200. The temperature sensors 200 are preferably semiconductor temperature sensors and each configured to supply a measurement signal (for example, an electric resistance value or a value of an electric voltage), from which a temperature of the respective temperature sensor 200 can be concluded. These measurement signals are therefore referred to hereafter as temperature values. The temperature sensors 200 are thus configured to supply temperature values.

The temperature sensors 200 are thermally conductively connected to the picture elements 100 of the optoelectronic component 10. The temperature value supplied by a temperature sensor 200 of the optoelectronic component 10 therefore also each specifies, for example, the temperature of one or more of the picture elements 100 adjacent to the respective temperature sensor 200. The temperature sensors 200 thus enable at least approximate determination of the temperatures of the individual picture elements 100 of the optoelectronic component 10.

In the example of the optoelectronic component 10 shown in FIGS. 1 and 2, the temperature sensors 200 are arranged in a two-dimensional matrix arrangement 210. In this example, the two-dimensional matrix arrangement 210 comprises five lines and five columns of temperature sensors 200. The number of the temperature sensors 200 is thus less in the optoelectronic component 10 than the number of the picture elements 100. However, it is also possible to form the optoelectronic component 10 having as many temperature sensors 200 as picture elements 100 or even having more temperature sensors 200 than picture elements 100.

In the example of the optoelectronic component 10 shown in FIGS. 1 and 2, each temperature sensor 200 is arranged on a common corner point of each four picture elements 100 adjacent to one another. The temperature value supplied by the respective temperature sensor 200 thus approximately indicates a mean value of the temperatures of the four picture elements 100 adjacent to the respective temperature sensor 200.

It is possible by interpolation of the temperature values supplied by the multiple temperature sensors 200 to obtain further temperature values to determine the temperature of the individual picture elements 100 more accurately and with higher spatial resolution. The temperature sensors 200 could also be arranged at positions other than those shown for this purpose.

In the schematic illustration of FIG. 2, the temperature sensors 200 are arranged, like the light-emitting diode chips 130, on the upper side 401 of the carrier 400. In this example, the temperature sensors 200 are arranged between the light-emitting diode chips 130. However, it is also possible to integrate the temperature sensors 200 into the carrier 400 or to arrange them at another position. An integration of the temperature sensors 200 into the carrier 400 can be reasonable, for example, if the carrier 400 is formed as a semiconductor chip.

The optoelectronic component 10 furthermore comprises a control unit 300. The control unit 300 is not shown in FIG. 1 for the sake of comprehensibility. The control unit 300 is provided to control the picture elements 100 of the optoelectronic component 10. For this purpose, the control unit 300 connects to the current sources 140 to supply the light-emitting diode chips 130 of the picture elements 100 with configurable current and voltage values. Moreover, the control unit 300 is connected to the temperature sensors 200, to acquire temperature values by the temperature sensors 200.

The control unit 300 can be integrated into the carrier 400 and can be arranged on the upper side 401 or the lower side of the carrier 400, or, as shown in the schematic illustration of FIG. 2, can be arranged outside the carrier 400.

The control unit 300 can comprise, for example, one or more microcontrollers and/or an application-specific integrated circuit.

The control unit 300 is configured to acquire temperature values supplied by the temperature sensors 200 of the optoelectronic component 10 and to control the picture elements 100 in dependence on the acquired temperature values. The control unit 300 is configured to carry out this method periodically repeatedly.

For the control of the picture elements 100 in dependence on the acquired temperature values, the control unit 300 can change, in at least one picture element 100 of the optoelectronic component 10, the current strength supplied by the current source 140 or the supply voltage provided by the current source 140, respectively.

During operation of the optoelectronic component 10, a picture element 100 emitting light 101 can heat up due to the waste heat arising in the light-emitting diode chip 130 of the picture element 100. The resulting heating of the picture element 100 can be particularly strong if the picture elements 100 of the optoelectronic component 10 adjacent to the picture element 100 also emit light 101. The electrical characteristics and/or the emission properties of the light-emitting diode chip 130 of the picture element 100 can change due to heating of the picture element 100. For example, a wavelength or an intensity of the light 101 emitted by the light-emitting diode chip 130 can change with increasing temperature. If the picture element 100 comprises multiple light-emitting diode chips 130, a light color and/or a color temperature of the light 101 emitted by the picture element 100 can thus change with increasing temperature of the picture element 100.

The wavelength, intensity, light color, and color temperature of the light 101 emitted by the picture element 100 can also be dependent on the supply voltage and/or the supply current of the one or more light-emitting diode chips 130 of the picture element 100. This makes it possible that the control unit 300 of the optoelectronic component 10 can be configured so that it controls at least one picture element 100 of the optoelectronic component 10 in dependence on the temperature values acquired by the temperature sensors 200 by changing the supply voltage or the supply current such that the wavelength, intensity, light color, and/or color temperature of the light 101 emitted by this picture element 100 approximates a desired target value.

The light-emitting diode chips 130 of the picture elements 100 of the optoelectronic component 10 can also be subjected to excessively strong aging in excessive heating. For example, in excessive heating, electromigration can occur. Such effects can reduce the service life of the light-emitting diode chip 130 of the picture element 100.

The control unit 300 can be configured to control at least one of the picture elements 100 of the optoelectronic component 10 in dependence on the temperature values acquired by the temperature sensors 200 so that the temperature of this picture element 100 does not increase further or even decreases. For this purpose, the control unit 300 can change, for example, by the current source 140 of this picture element 100, the supply voltage applied to the light-emitting diode chip 130 of this picture element 100 or the supply current fed into the light-emitting diode chip 130 of this picture element 100 such, for example, reduce it, that the temperature of the picture element 100 remains constant or sinks.

The control unit 300 can be configured to control multiple or all picture elements 100 of the optoelectronic component 10 in the described manner in dependence on the temperature values supplied by the temperature sensors 200. It is advantageous for this purpose that the multiple temperature sensors 200 of the optoelectronic component 10 enable a determination of the respective temperatures of the individual picture elements 100. In addition to the temperature values supplied by the temperature sensors 200, further temperature values can optionally be determined by interpolation of the temperature values supplied by the temperature sensors 200. The control unit 300 can be configured to associate a separate temperature value with each of the picture elements 100 of the optoelectronic component 10 in this manner.

It is advantageous if the control unit 300 controls the picture elements 100 of the optoelectronic component 10 in dependence on the respective temperature value of the picture element 100. It is also possible to control each picture element 100 in dependence on the temperature of this picture element 100 and in addition in dependence on the temperature values of the picture elements 100 of the optoelectronic component 10 surrounding the picture element 100.

The example of the optoelectronic component 10 shown in FIGS. 1 and 2 furthermore comprises a storage device 310. The storage device 310 is not shown in the illustration of FIG. 1 for the sake of comprehensibility. The storage device 310 can be configured as a digital data memory, for example, as a DRAM, a SRAM, or a flash memory. The storage device 310 can be combined with the control unit 300 to form a unit.

The control unit 300 of the optoelectronic component 10 is configured to log the temperature values acquired by the temperature sensors 200 by storing them in the storage device 310. It is possible to save all temperature values acquired at any time permanently in the storage device 310. However, it is also possible to save only selected temperature values in the storage device 310, for example, only every nth temperature value per temperature sensor 200, only one temperature value per defined time interval and temperature sensor 200, only the most recent temperature values of a defined time period, or only the temperature values supplied by selected temperature sensors 200.

The control unit 300 of the optoelectronic component 10 can be configured to mathematically or statistically analyze the temperature values logged in the storage device 310 and take into consideration the result of this analysis in the control of the picture elements 100. For example, the control unit 300 can be configured to compute a thermal stress incurred over the previous operating life of the optoelectronic component 10 from the temperature values logged in the storage device 310 for each picture element 100 of the optoelectronic component 10. This computation can be carried out, for example, using a model describing how strongly which operating temperature stresses and damages the picture elements 100. For this purpose, for example, temperature-dependent aging effects and effects of a temperature-dependent electromigration can be taken into consideration.

The control unit 300 of the optoelectronic component 10 can be configured to take into consideration the thermal stress of the different picture elements 100 computed on the basis of the logged temperature values in the control of the picture elements 100. For example, the control unit 300 can control the picture elements 100 of the optoelectronic component 10 so that picture elements 100 that have already experienced a high thermal stress are protected in the further operation of the optoelectronic component 10. To protect individual picture elements 100, the picture elements 100 can be operated, for example, using reduced optical power or only during limited time windows. The function of the picture elements 100 to be protected can be at least partially taken over in this example by adjacent picture elements 100.

An increasing thermal stress of the picture elements 100 can result in a change of the electrical and/or optical properties of the light-emitting diode chips 130 of the picture elements 100. It is possible to at least partially compensate for these aging effects by adapting the supply currents and supply voltages supplied by the current sources 140. The control unit 300 can be configured to control the picture elements 100 so that aging effects of the picture elements 100 dependent on the incurred thermal stress of the picture elements 100 are at least partially compensated for.

The control unit 300 can furthermore be configured to compute, for each picture element 100 of the optoelectronic component 10, a remaining service life of this picture element 100 to be expected on the basis of the computed thermal stress. This computation can be carried out, for example, using a model describing the failure probability of the picture elements 100 in dependence on the incurred thermal stress.

The control unit 300 can be configured to take into consideration the computed values of the remaining service life to be expected of the picture elements 100 during the further control of the picture elements 100. For example, the control unit 300 can control the picture elements 100 of the optoelectronic component 10 so that picture elements 100 only still comprising a short remaining service life to be expected are protected. To protect individual picture elements 100, the picture elements 100 can be operated, for example, using reduced optical power or only during limited time windows. The function of the picture elements 100 to be protected can be at least partially taken over by adjacent picture elements 100 in this example.

In a simplified example of the optoelectronic component 10, the storage device 310 and the described logging of the acquired temperature values can be omitted. In this example of the optoelectronic component 10, the control of the picture elements 100 of the optoelectronic component 10 is only carried out in dependence on the last acquired temperature values.

Figure 3:
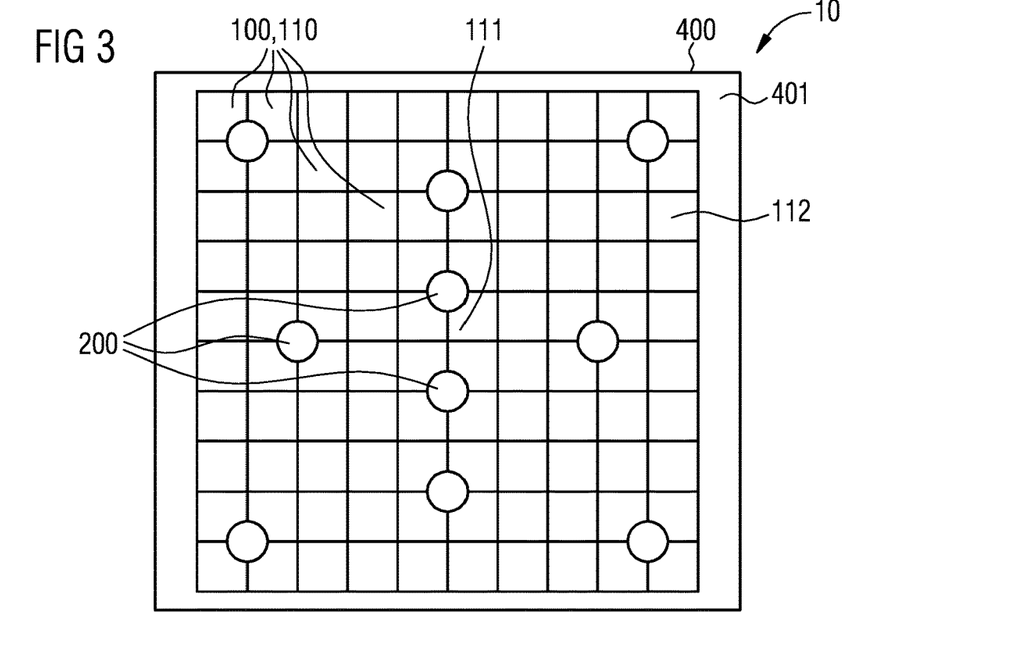
FIG. 3 schematically shows a top view of an optoelectronic component according to a further example.

FIG. 3 shows a schematic illustration of a top view of an alternative example of the optoelectronic component 10. In the example of the optoelectronic component 10 shown in FIG. 3, the temperature sensors 200 are not arranged in a regular matrix arrangement. Instead, the temperature sensors 200 are arranged in the example shown in FIG. 3 so that a higher number of temperature sensors 200 per picture element 100 is provided in a middle region 111 of the matrix arrangement 110 of picture elements 100 than in a peripheral region 112 of the matrix arrangement 110 of picture elements 100. In other words, the ratio of the number of the temperature sensors 200 to the number of the picture elements 100 is higher in the middle region 111 of the matrix arrangement 110 than in the peripheral region 112. This enables the temperatures of the picture elements 100 arranged in the middle region 111 of the two-dimensional matrix arrangement 110 to be determined with higher accuracy than the temperatures of the picture elements 100 arranged in the peripheral region 112 of the two-dimensional matrix arrangement 110.

Further alternative arrangements of the temperature sensors 200 are possible. For example, the temperature sensors 200 can be arranged so that more temperature sensors 200 are provided in the peripheral region 112 of the two-dimensional matrix arrangement 110 of picture elements 100 than in the middle region 111 of the two-dimensional matrix arrangement 110 of picture elements 100.

Figure 4:
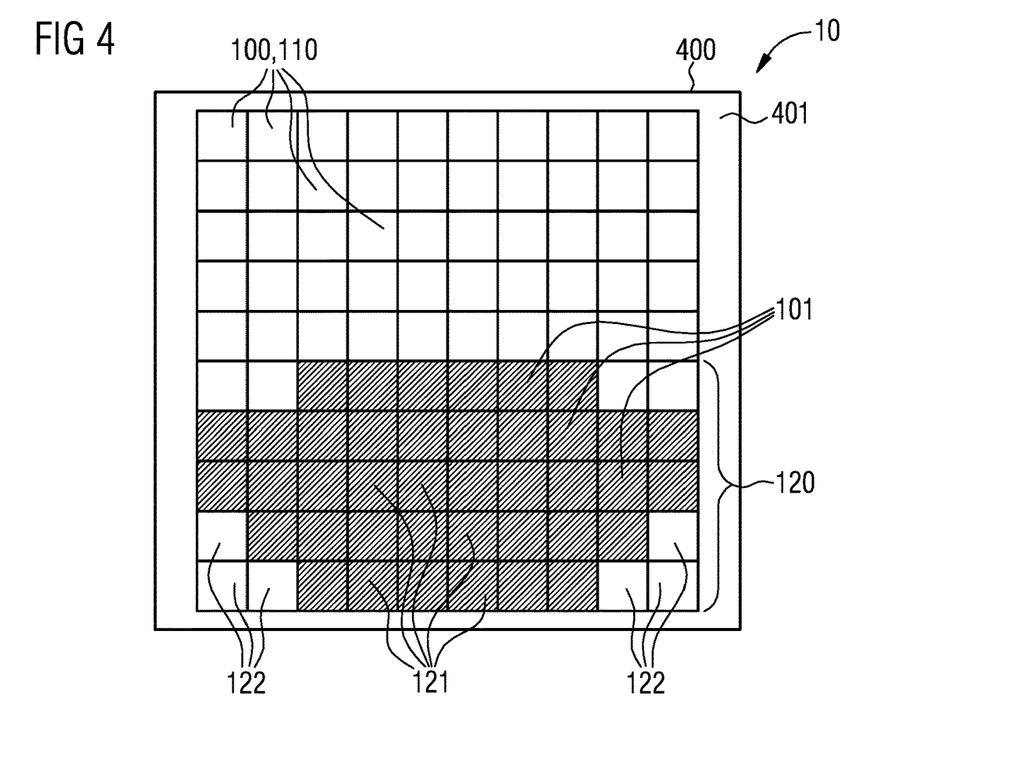
FIG. 4 schematically shows a top view of an optoelectronic component in a first operating state.
Figure 5:
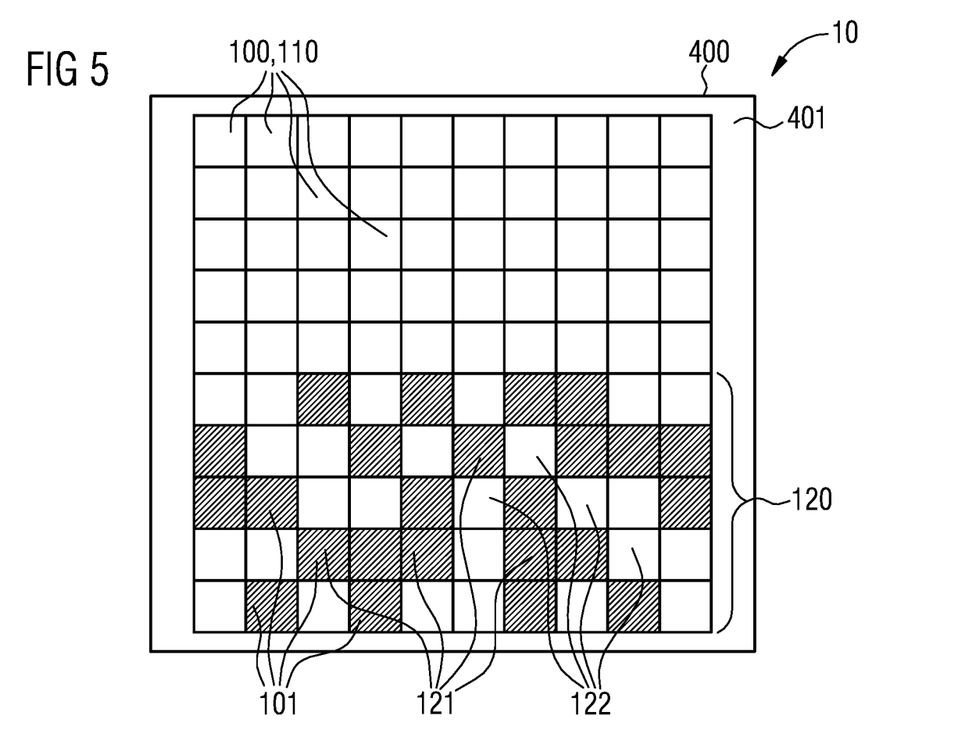
FIG. 5 schematically shows a top view of the optoelectronic component in a second operating state.

FIG. 4 shows a schematic illustration of the optoelectronic component 10 in a first operating state. FIG. 5 shows a schematic illustration of the optoelectronic component 10 in a second operating state. The temperature sensors 200 are not shown for the sake of comprehensibility in the illustrations of FIGS. 4 and 5.

An exemplary group 120 of adjacent picture elements 110 is identified in FIG. 4. In the example shown in FIG. 4, the group 120 of adjacent picture elements 110 is formed by the lower half of the two-dimensional matrix arrangement 110 of picture elements 100. The group 120 of adjacent picture elements 110 can also comprise other picture elements 100, however.

In the operating state of the optoelectronic component 10 shown in FIG. 4, first picture elements 121 of the group 120 are controlled so that they emit light 101. Second picture elements 122 of the group 120 of picture elements 100, in contrast, are controlled so that they do not emit light 101. The first picture elements 121 and the second picture elements 122 are selected in this example so that the light 101 emitted by the group 120 of adjacent picture elements 100 overall comprises a desired intensity and light distribution.

In the operating state of the optoelectronic component 10 shown in FIG. 4, the first picture elements 121 emitting light 101 of the group 120 of adjacent picture elements 100 are located directly adjacent to one another. High temperatures (hotspots) can thus develop in the region of the first picture elements 121 that can result in a high thermal stress of the affected picture elements 100.

In the operating state of the optoelectronic component 10 shown in FIG. 5, first picture elements 121 of the group 120 of adjacent picture elements 100 are also controlled so that they emit light 101, while second picture elements 122 of the group 120 of adjacent picture elements 100 are controlled so that they do not emit light. The number of the first picture elements 121 emitting light 101 is selected in this example so that the light 101 emitted from the entire group 120 of adjacent picture elements 100 in the operating state shown in FIG. 5 comprises approximately the same intensity as in the operating state shown in FIG. 4. The positions of the first picture elements 121 and the second picture elements 122 within the group 120 of adjacent picture elements 100 are selected randomly in the operating state shown in FIG. 5, however. Not all first picture elements 121 emitting light 101 are thus located directly adjacent to one another. In this way, the risk that excessively high temperatures develop in specific regions of the two-dimensional matrix arrangement 110 of picture elements 100 is reduced in the operating state shown in FIG. 5.

The control unit 300 of the optoelectronic component 10 can be configured to control the picture elements 100 of the optoelectronic component 10 so that the light 101 emitted by a group 120 of adjacent picture elements 100 comprises desired properties, for example, a desired intensity, wavelength, light color, and/or color temperature. For this purpose, the randomly selected first picture elements 121 of the group 120 of adjacent picture elements 100 are controlled so that they emit light 101, while the remaining second picture elements 122 of the group 120 of adjacent picture elements 100 are controlled so that they do not emit light 101. The control unit 300 can furthermore be configured to periodically randomly reselect the first picture elements 121 emitting light 101 and the second picture elements 122 not emitting light 101 of the group 120 of adjacent picture elements 100.

Figure 6:
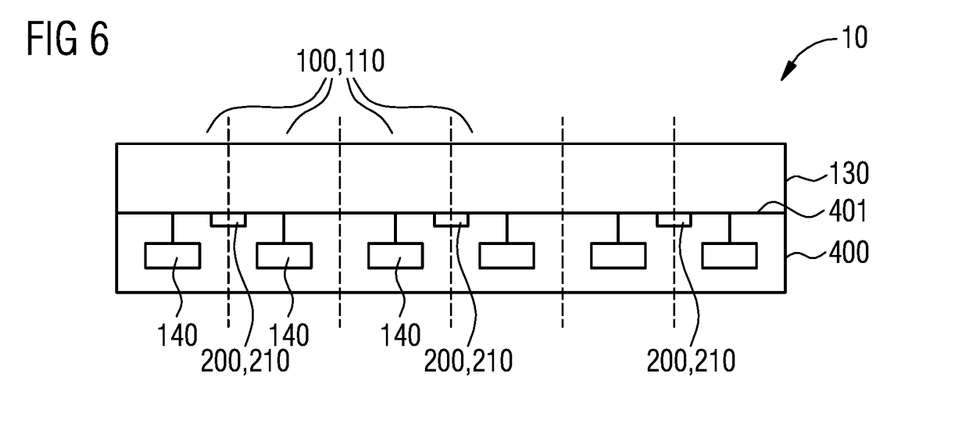
FIG. 6 schematically shows a sectional side view of a further example of the optoelectronic component.

FIG. 6 shows a schematic sectional side view of a part of the optoelectronic component 10 according to an alternative area. The example shown in FIG. 6 comprises significant correspondences with the example of the optoelectronic component 10 shown in FIG. 2. Corresponding components are provided with the same reference signs in FIG. 6 as in FIG. 2. Only the deviations of the example shown in FIG. 6 from the example shown in FIG. 2 are described hereafter. Otherwise, the above description also applies to the example of the optoelectronic component 10 shown in FIG. 6.

In the example of the optoelectronic component 10 shown in FIG. 6, only a single light-emitting diode chip 130 is provided, which forms multiple picture elements 100 of the optoelectronic component 10. For this purpose, the light-emitting diode chip 130 comprises multiple integrated light-emitting diode structures arranged in the two-dimensional matrix arrangement 110. Each of the light-emitting diode structures integrated into the light-emitting diode chip 130 forms one of the picture elements 100 of the optoelectronic component 10 and is configured to emit light 101. It is expedient that all light-emitting diode structures of the light-emitting diode chip 130 may be controlled independently of one another.

In the example of the optoelectronic component 10 shown in FIG. 6, the carrier 400 is formed as a semiconductor chip, for example, as a silicon semiconductor chip. The light-emitting diode chip 130 is arranged and fastened on the upper side 401 of the carrier 400. For example, the light-emitting diode chip 130 can be connected by a hybrid bond connection, a solder connection, or a direct bond connection to the upper side 401 of the carrier 400.

In the example of the optoelectronic component 10 shown in FIG. 6, the current sources 140 that control the light-emitting diode structures of the light-emitting diode chip 130 forming the individual picture elements 100 are integrated into the carrier 400. However, it is also possible not to integrate the current sources 140 into the carrier 400, but rather to arrange them separately from the carrier 400.

The current sources 140 again connect to a control unit 300, as was described above on the basis of FIG. 2, in the example of the optoelectronic component 10 shown in FIG. 6. It is possible to also integrate the control unit 300 into the carrier 400. The storage device 310 could also be integrated into the carrier 400. In the schematic illustration of FIG. 6, the control unit 300 and the storage device 310 are not shown for the sake of comprehensibility.

In the example of the optoelectronic component 10 shown in FIG. 6, the temperature sensors 200 are also integrated into the carrier 400. In this example, the temperature sensors 200 are arranged so that thermally conductive connections exist between the picture elements 100 and the temperature sensors 200. For this purpose, the temperature sensors 200 can be arranged, for example, close to the upper side 401 of the carrier 400.

Our methods and components are illustrated and described in greater detail on the basis of preferred examples. Nonetheless, this disclosure is not restricted to the examples. Rather, other variations can be derived therefrom by those skilled in the art, without leaving the scope of protection of the appended claims.

This application claims priority of DE 10 2017 105 131.7, the subject matter of which is incorporated herein by reference.

The invention claimed is:

1. A method of operating an optoelectronic component, comprising a plurality of picture elements that are each configured to emit light, a carrier formed as a semiconductor chip, at least one light-emitting diode chip arranged on an upper side of the carrier, and a plurality of temperature sensors integrated into the carrier and thermally conductively connected to the picture elements, the method comprising:
acquiring temperature values supplied by the temperature sensors; and
controlling the picture elements in dependence on the acquired temperature values.

2. The method according to claim 1, further comprising interpolating the acquired temperature values to obtain further temperature values.

3. The method according to claim 1, wherein a supply voltage or a supply current strength is changed in dependence on the acquired temperature values in at least one picture element.

4. The method according to claim 3, wherein the supply voltage or the supply current is changed so that a wavelength, intensity, light color, and/or color temperature of the light emitted by the picture element approximates a target value.

5. The method according to claim 3, wherein the supply voltage or the supply current is changed so that a temperature of the picture element decreases.

6. The method according to claim 1, further comprising logging the acquired temperature values.

7. The method according to claim 6, further comprising computing a thermal stress incurred over the previous operating life for each picture element from the logged temperature values.

8. The method according to claim 7, wherein control of the picture elements is carried out in dependence on the computed thermal stress of the respective picture elements.

9. The method according to claim 7, further comprising computing a remaining service life to be expected for each picture element from the computed thermal stresses.

10. The method according to claim 1, wherein randomly selected first picture elements of a group of adjacent picture elements are controlled so that they emit light, and remaining picture elements of the group of adjacent picture elements are controlled so that they do not emit light.

11. An optoelectronic component comprising:
a plurality of picture elements, each configured to emit light, and a plurality of temperature sensors thermally conductively connected to the picture elements, wherein the optoelectronic component comprises a carrier, the optoelectronic component comprises at least one light-emitting diode chip arranged on an upper side of the carrier,
the carrier is formed as a semiconductor chip, and
the temperature sensors are integrated into the carrier.

12. The optoelectronic component according to claim 11, wherein the optoelectronic component comprises a control unit configured to operate the optoelectronic component according to a method comprising:
acquiring temperature values supplied by the temperature sensors; and
controlling the picture elements in dependence on the acquired temperature values.

13. The optoelectronic component according to claim 11, wherein the light-emitting diode chip connects to the upper side of the carrier by a solder connection, hybrid bond connection, or direct bond connection.

14. The optoelectronic component according to claim 11, wherein each light-emitting diode chip forms multiple picture elements.

15. The optoelectronic component according to claim 11, wherein each picture element comprises at least one light-emitting diode chip.

16. The optoelectronic component according to claim 11, wherein a number of the temperature sensors is less than or equal to the number of the picture elements.

17. The optoelectronic component according to claim 11, wherein the picture elements are arranged in a two-dimensional matrix arrangement.

18. The optoelectronic component according to claim 11, wherein the temperature sensors are arranged in a two-dimensional matrix arrangement.

19. The optoelectronic component according to claim 18, wherein a middle region of the matrix arrangement of picture elements comprises a higher number of temperature sensors per picture element than a peripheral region of the matrix arrangement of picture elements.

20. The optoelectronic component according to claim 11, wherein the optoelectronic component comprises a plurality of current sources or voltage sources that apply electric current and electric voltage to the picture elements.

21. The optoelectronic component according to claim 11, wherein the optoelectronic component comprises a plurality of current sources or voltage sources that apply electric current and electric voltage to the picture elements, and the current sources or voltage sources are integrated into the carrier.

22. The optoelectronic component according to claim 11, wherein the optoelectronic component comprises a storage device that saves acquired temperature values.

23. A method of operating an optoelectronic component, comprising a plurality of picture elements and a plurality of temperature sensors, wherein the picture elements are each configured to emit light, the temperature sensors thermally conductively connect to the picture elements, randomly selected first picture elements of a group of adjacent picture elements are controlled so that they emit light, and remaining picture elements of the group of adjacent picture elements are controlled so that they do not emit light, the method comprising:

acquiring temperature values supplied by the temperature sensors; and controlling the picture elements in dependence on the acquired temperature values.

* * * * *